(12) United States Patent
Rebecq et al.

(10) Patent No.: US 11,295,456 B2
(45) Date of Patent: Apr. 5, 2022

(54) VISUAL-INERTIAL ODOMETRY WITH AN EVENT CAMERA

(71) Applicant: UNIVERSITÄT ZÜRICH, Zürich (CH)

(72) Inventors: Henri Rebecq, Zürich (CH); Davide Scaramuzza, Zürich (CH)

(73) Assignee: UNIVERSITÄT ZÜRICH, Zürich (CH)

( * ) Notice: Subject to any disclaimer, the term of this patent is extended or adjusted under 35 U.S.C. 154(b) by 0 days.

(21) Appl. No.: 16/644,174

(22) PCT Filed: Sep. 3, 2018

(86) PCT No.: PCT/EP2018/073641
§ 371 (c)(1),
(2) Date: Mar. 4, 2020

(87) PCT Pub. No.: WO2019/043233
PCT Pub. Date: Mar. 7, 2019

(65) Prior Publication Data
US 2020/0219267 A1    Jul. 9, 2020

(30) Foreign Application Priority Data

Sep. 4, 2017 (EP) .................................... 17189223

(51) Int. Cl.
*G06T 7/246* (2017.01)
*G06T 7/593* (2017.01)
*G06K 9/46* (2006.01)

(52) U.S. Cl.
CPC ............ *G06T 7/246* (2017.01); *G06K 9/4661* (2013.01); *G06T 7/596* (2017.01);
(Continued)

(58) Field of Classification Search
CPC .................. G06T 7/246; G06T 7/596; G06T 2207/10028; G06T 2207/20201; G06T 2207/30244; G06K 9/4661
See application file for complete search history.

(56) References Cited

U.S. PATENT DOCUMENTS 9,415,310 B2 *  8/2016  Martini ............... A63F 13/5378
9,424,647 B2 *  8/2016  Flint .................. G06K 9/00671
(Continued)

OTHER PUBLICATIONS

Elias Mueggler Et Al. "Continuous-Time Visual-Inertial Trajectory Estimation with Event Cameras." arXiv.org, Feb. 23, 2017, Cornell University Library, 201 Olin Library Cornell University Ithaca, NY 14853 14 pages.
(Continued)

*Primary Examiner* — Manav Seth
(74) *Attorney, Agent, or Firm* — JMB Davis Ben-David

(57) ABSTRACT

The invention relates a method for generating a motion-corrected image for visual-inertial odometry comprising an event camera rigidly connected to an inertial measurement unit (IMU), wherein the event camera comprises pixels arranged in an image plane that are configured to output events in presence of brightness changes in a scene at the time they occur, wherein each event comprises the time at which it is recorded and a position of the respective pixel that detected the brightness change, the method comprising the steps of: Acquiring at least one set of events (S), wherein the at least one set (S) comprises a plurality of subsequent events (e); Acquiring IMU data (D) for the duration of the at least one set (S); Generating a motion-corrected image from the at least one set (S) of events (e), wherein the motion-corrected image is obtained by assigning the position ($x_j$) of each event ($e_j$) recorded at its corresponding event time ($t_j$) at an estimated event camera pose ($T_{t_j}$) to an adjusted event position ($x'_j$), wherein the adjusted event
(Continued)

Figure 1:
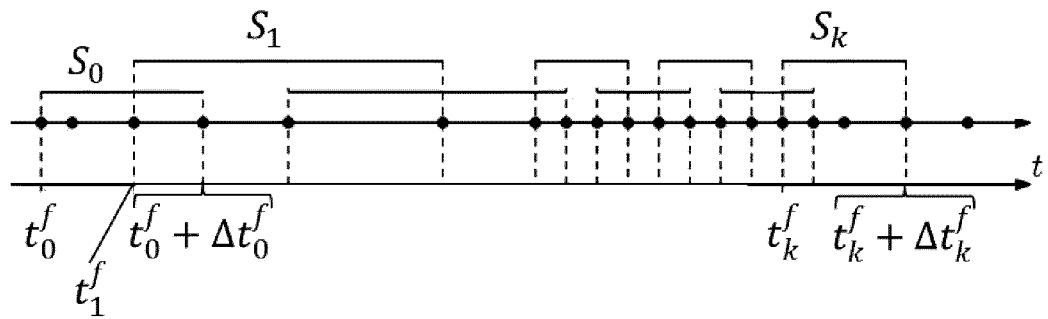

position ($x'_j$) is obtained by determining the position of the event ($e_j$) for an estimated reference camera pose ($T_{f_k}$) at a reference time ($_{f_k}$), wherein the estimated camera pose ($T_{t_j}$) at the event time ($t_j$) and the reference camera pose ($T_{f_k}$) at the reference time ($_{f_k}$) are estimated by means of the IMU data (D).

19 Claims, 2 Drawing Sheets

(52) U.S. Cl.
CPC .............. *G06T 2207/10028* (2013.01); *G06T 2207/20201* (2013.01); *G06T 2207/30244* (2013.01)

(56) References Cited

U.S. PATENT DOCUMENTS

| | | | | |
|---|---|---|---|---|
| 9,445,003 | B1* | 9/2016 | Lelescu | H04N 5/23232 |
| 9,578,241 | B2* | 2/2017 | Ryu | H04N 5/23267 |
| 9,679,381 | B2* | 6/2017 | Martini | G06T 7/0008 |
| 10,198,660 | B2* | 2/2019 | Ji | G06K 9/4661 |
| 10,242,455 | B2* | 3/2019 | Harmsen | G06T 7/292 |
| 10,636,151 | B2* | 4/2020 | Comport | G06T 7/248 |
| 10,719,939 | B2* | 7/2020 | Holzer | G06F 3/011 |
| 10,848,672 | B2* | 11/2020 | Ryu | H04N 5/23254 |
| 2016/0209217 | A1 | 7/2016 | Babu | |
| 2017/0148222 | A1* | 5/2017 | Holzer | H04N 13/279 |
| 2020/0005469 | A1* | 1/2020 | Daniilidis | H04N 5/232 |
| 2020/0103961 | A1* | 4/2020 | Wang | G06T 7/20 |

OTHER PUBLICATIONS

Alex Zihao Zhu Et Al. "Event-Based Visual Inertial Odometry" pp. 5391-5399 CVPR 2017 Open Access, available online at https://dx.doi.org/10.1109/CVPR.2017.616.

Stefan Leutenegger "Keyframe-based visual-inertial odometry using nonlinear optimization", International Journal of Robotics Research., Mar. 1, 2015, vol. 34, Nr.:3, pp. 314-334 available online at https://dx.doi.org/10.1177/0278364914554813.

Henri Rebecq "EVO: A Geometric Approach to Event-Based 6-DOF Parallel Tracking and Mapping in Real Time", IEEE Robotics and Automation Letters, Apr. 1, 2017, vol. 2, Nr.:2, pp. 593-600, available online at https://dx.doi.org/10.1109/LRA.2016.2645143.

* cited by examiner

A)

B)

C)

VISUAL-INERTIAL ODOMETRY WITH AN EVENT CAMERA

CROSS-REFERENCE TO RELATED APPLICATIONS

This is the U.S. National Stage of International Patent Application No. PCT/EP2018/073641 filed on Sep. 3, 2018, which in turn claims the benefit of European Patent Application No. 17189223.5 filed on Sep. 4, 2017.

The invention relates to a method for generating a motion-corrected image from event cameras for visual-inertial odometry as well as to a method for visual-inertial odometry with an event camera.

Event cameras, such as the Dynamic Vision Sensor (DVS), work very differently from a traditional camera.

They have independent pixels that only send information referred to as events in presence of brightness changes in the scene at the time they occur.

Thus, the output is not an intensity image but a stream of asynchronous events particularly at microsecond resolution, where each event comprises the time at which it is recorded and a position or an address of the respective pixel that detected the brightness change as well as the sign of the brightness change (referred to as polarity).

Since events are caused by brightness changes over time, an event camera naturally responds to edges in the scene in presence of relative motion.

Event cameras have numerous advantages over standard cameras: a latency in the order of microseconds, low power consumption, and a very high dynamic range (130 dB compared to 60 dB of standard, frame-based cameras).

Most importantly, since all the pixels are independent, such sensors don't inherently suffer from motion blur.

These properties render event cameras ideal sensors for applications where fast response and high efficiency are crucial, and also for scenes with wide variations of illumination.

Additionally, since information is only sent in presence of brightness changes, the sensor removes inherent redundancy of standard cameras, thus requiring a very low data rate (Kilobytes vs Megabytes). An example of such an event camera with an IMU is the DAVIS [3].

These properties make event cameras in applications where fast response and high efficiency are important and also in scenes with wide variations of illumination. Additionally, since information is particularly only generated when the brightness in a pixel changes, the event camera removes inherent information redundancy of conventional frame-based cameras, thus requiring a lower data rate.

The output of the event camera is not an intensity image but a stream of particularly asynchronous events at microsecond resolution, where each event consists of its space-time coordinates and the sign of the brightness change (i.e. no intensity). Since events are caused by brightness changes over time, an event camera naturally responds to edges in the scene in presence of relative motion.

Event cameras are used for visual odometry, i.e. the task for estimating a sensors position and orientation in space based on visual data. Visual odometry finds applications particularly in simultaneous localization and mapping (SLAM) applications.

In the following, orientation and position are summarized under the term "pose". The orientation and position each can comprise up to three degrees of freedom. The orientation can be described for example by the so-called Euler angles, wherein the position can be specified by Cartesian coordinates in a specific frame of reference. Therefore, a pose comprises particularly six degrees of freedom.

In contrast to visual odometry or visual-based SLAM, one refers to visual-inertial odometry (VIO) or visual-inertial SLAM if not only visual data but also inertial data from an inertial measurement unit (IMU) are used for odometry or SLAM respectively.

State-of-the-art VIO and/or SLAM algorithms are capable of large-scale tracking, with an overall drift below 0.5% of the travelled distance [7]. However, VIO still fails in a number of situations, such as high-speed motions or high-dynamic range scenes.

In the first case, large amounts of motion blur on the images spoil the visual information, forcing the method to rely on integration of the IMU data, resulting in large amounts of accumulated drift.

In the second case, due to the limited dynamic range of frame-based cameras, large regions on the image are either over-, or under-exposed, which reduces drastically the amount of information exploitable.

SLAM and VIO methods can be categorized into methods comprising a non-linear optimization method, or a filtering-based method. Due to computational constraints, for a long time, real-time odometry or SLAM algorithms were only possible using a filtering approach, such as the Extended Kalman Filter (EKF) method [11].

However, non-linear optimization methods can provide better accuracy for a similar computational work, when compared to filtering methods.

A non-linear optimization or non-linear programming refers particularly to the use of a non-linear objective function with respect to the variable to be minimized or maximized. Furthermore, in the context of the current specification, non-linear optimization particularly refers to methods that optimize the variables for past data from the expedition, and thus iteratively or retrospectively adjusting for example the generated three-dimensional map of the scene, wherein filtering methods are applied particularly only to a current measurement and the generated map is not adjusted retrospectively.

The use of event cameras for VIO and SLAM is known by the state of the art [11]. However, the disclosed method in [11] exhibits limited accuracy and processing speed. In [11] a filtering approach is used for SLAM, rendering the method expectedly less accurate, as filtering methods are intrinsically less accurate than for example non-linear optimization approaches. Non-linear optimization approaches in turn, are known to be computational expensive and are not suited for the data structure provided by event cameras, as they require images rather than a stream of events, limiting their use for real-time applications.

A computationally cost-efficient and accurate processing of the stream of events such that it becomes applicable for non-linear optimization VIO and SLAM algorithms while simultaneously maintaining the inherent higher degree of information is an unsolved problem.

Therefore, an object of the present invention is to provide a method and a computer program for generating a motion-corrected image from event cameras for visual-inertial odometry and SLAM applications. The object is achieved by the method having the features of claim 1.

Advantageous embodiments are described in the sub-claims.

According to claim 1, a method for generating a motion-corrected image for visual-inertial odometry (VIO) or visual-inertial SLAM comprises a particularly monocular event camera rigidly connected to an inertial measurement unit (IMU), wherein the event camera comprises pixels arranged in an image plane that are configured to particularly only output events in presence of brightness changes in a scene at the time they occur, wherein each event comprises the time at which it is recorded (also referred to as event time), a particularly two-dimensional position of the respective pixel (also referred to as an even position) that detected the brightness change as well as particularly a polarity value indicating the sign of the brightness change. The method according to the invention further comprises the steps of:

Acquiring at least one set of events, wherein the at least one set comprises a plurality of subsequently or simultaneously recorded events from the event camera, particularly wherein the event time of the earliest event and the latest event delimit a time interval of the at least one set;

Acquiring IMU data for the duration, particularly during the time interval of the at least one set;

Generating a motion-corrected image from the at least one set of events, wherein the motion-corrected image is obtained by assigning the position of each event recorded at its corresponding event time $t_j$ at an estimated event camera pose corresponding to the event time $t_j$ to an adjusted event position, wherein the adjusted event position is obtained by determining the position of the event in a frame of reference of the event camera and an associated estimated reference camera pose at a reference time $t_k^f$ wherein the frame of reference of the event camera and the estimated camera pose at time $t_j$ as well as the reference camera pose and the corresponding frame of reference of the event camera at time $t_k^f$, are estimated by means of the IMU data.

The camera pose at time $t_j$ and the reference camera pose at the time $t_j^f$, each have a frame of reference of the event camera associated to it. The time $t_k^f$ is also referred to as reference time.

Alternatively and equivalently, the motion-corrected image can be generated from the at least one set of events, by adjusting the event position recorded at its corresponding event time by transforming the event position in the frame of reference of the event camera at it the corresponding event time $t_j$ to the frame of reference of the event camera at the reference time $t_k^f$.

The reference time $t_k^f$, can be the time of the earliest event comprised in the at least one set of events.

Pixel values of the motion-corrected image particularly correspond to the aggregated polarity of events from the at least one set at the adjusted event positions.

The motion-corrected image has a greatly reduced or no motion blur, such that any subsequent evaluation of the motion-corrected event image can yield more precise results. Particularly feature detection is greatly enhanced and can be performed with an increased reliability, as motion blur is absent in the motion-corrected images.

The processing time for generating the motion-corrected images is well within time scales that are considered as being real-time, i.e. particularly below 5 ms for 240×180 pixels, allowing the use of the method in time-sensitive applications.

The reference time for which the motion-corrected image is generated particularly corresponds to the earliest or latest event time of the set. The reference pose is particularly estimated from integrating the IMU data for a set of associated equations of motion. From an initial starting pose of the event camera it is particularly possible to estimate any later camera pose relative to the initial camera pose.

The estimated camera pose from the IMU data can be (re-)determined more precisely with subsequent image processing applications, such as VIO or SLAM. However, it is particularly not necessary to re-generate the motion-corrected images for a more precisely determined camera pose, even though it is possible. The event time is particularly provided with a microsecond resolution.

The events can be ordered within the at least one set by their corresponding event times.

According to an embodiment of the invention, from the IMU data the camera pose at the event time $t_j$ is estimated particularly by means of a homogenous transformation $T_{t_k^f, t_j}$ of the reference camera pose $T_{t_k^f}$ to the estimated camera pose $T_{t_j}$.

The transformation is particularly achieved by estimating a trajectory, comprising a pose of the event camera for a plurality of time points for the duration of the set, wherein the event camera poses can be interpolated for any specific time.

The transformation $T_{t_k^f, t_j}$ is particularly a function that maps the frame of references of the event camera at the respective times to each other.

Unlike [11], a global motion correction, i.e. the generation of a motion correct image is performed globally (and not locally, independently for each feature tracked) for the pixels of the event camera. Instead of explicitly estimating the motion parameters ("optic flow") that allow warping of the events to a common frame (i.e. do motion correction), the method according to the invention particularly uses the following information to generate motion corrected image with a global transformation:

Information regarding the IMU data, which particularly provides an estimate of the angular velocity.

Information from a previous odometry estimate, which particularly provides the global camera pose, and the camera linear velocity.

Information about the depth in the scene.

In contrast, [11] teaches a correction for the motion of the events by back-projecting said events on a current frame based on an estimated optical flow. The motion correction in [11] is part of a feature tracking method that estimates an optical flow, feature appearance and feature position by means of an optimization method. As such, the feature tracking method estimates the optical flow only locally, i.e. the estimated optical flow is valid only for one feature and not all features in the image and thus the optical flow estimation has to be carried out once per feature, which is computationally expensive.

To simplify the problem and thus to reduce the computational load, [11] assumes that each feature is locally planar, i.e. that the 3D region corresponding to the feature locally lies on a plane in 3D, which allows [11] to simplify the optimization. However, even with this simplification, the optimization procedure must still be carried out for every feature tracked.

According to another embodiment of the invention, for the determination of the adjusted event position for the reference camera pose in the corresponding frame of reference of the event camera, a projection method is executed comprising the steps of:

Estimating for the event time of the respective event a depth information for the event position of the event in a world reference frame for the estimated camera pose, wherein the depth information is estimated from a plurality of three-dimensional positions of landmarks in the world reference frame;

Providing a camera projection model that is configured to describe the projection of a three-dimensional position onto a two-dimensional position in the image plane of the event camera;

Using the camera projection model, the depth information and the estimated transformation to project the event position recorded at the estimated camera pose at the corresponding event time from the image plane onto a three-dimensional position in the world reference frame and re-projecting the three-dimensional position on which the event position has been projected from the world reference frame onto the image plane of the camera reference pose at the reference time $t_k^f$.

The projection method therefore comprises a transformation between the frame of reference of the event camera and the world reference frame. As the event camera potentially changes its pose over time, landmarks and features located in the scene which the camera records, change position and orientation in the frame of reference of the event camera.

The world reference frame is for example fixedly associated with the surrounding scene of the camera that is not attached to the camera.

The image plane of the camera reference pose is particularly the image plane of the event camera when it assumes the reference camera pose.

This embodiment particularly allows to make full use of the temporal information comprised in the events that is particularly absent in frame based cameras.

The projection model for the event camera can be for example determined by calibration measurements.

According to another embodiment of the invention, each pixel of the event camera has an associated depth information, such as a depth value, or is provided with an depth information. The depth information is particularly provided by landmarks located in the scene. In VIO and SLAM application these landmarks form the map within which the camera pose is estimated.

When no landmarks are yet identified, a constant depth information can be assumed for the events. In case the motion-corrected image is used in the context of a VIO or a SLAM algorithm, more precise information on the landmarks positions, and thus, more precise depth information is acquired as the algorithms process new motion-corrected images.

The depth information, particularly the depth information for each pixel, can be estimated for example by Delaunay triangulation, barycentric interpolation, or just the median depth of the landmarks and assume that the depth is constant over the scene.

Particularly for the purpose of interpolation, the distribution of the features tracked in 3D is assumed to be planar.

Such planar 3D feature distribution is different from [11] disclosing "locally planar feature" assumption. According to another embodiment of the invention, the transformation, particularly the homogenous transformation, for each event is determined from the depth information, the IMU data particularly providing the camera angular velocity, and the state from the previous odometry estimate, particularly providing the camera linear velocity and camera pose.

Thus, an optical flow field is determined for the whole camera frame and not locally for each feature.

This allows a decoupling of the motion correction and the feature tracking.

This embodiment stands in strong contrast to [11], as [11] does not use depth information or previous odometry estimates to estimate a global optic flow field, valid on the entire camera frame. Rather, [11] estimates, for each feature, one independent optic flow vector in each iteration of the method, in order to compensate for the motion of each feature independently. As a consequence, feature tracking and motion correction are heavily intertwined and cannot be decoupled.

According to the invention, it is assumed, particularly only assumed, that the distribution of landmarks in space is planar i.e. the 3D landmarks lie on a plane.

This approximation allows computing a global optical flow while not impacting the quality of estimated camera poses significantly.

An effect of estimating the depth information for each event position is that motion correction can be performed across all pixels of the camera particularly by means of the homogeneous transformation. I.e. the whole camera frame can be processed as a whole. In contrast, [11] estimates a local optical flow for each landmark, i.e. for small windows having a typical size of a few pixels only, which, as pointed out above, is time and energy consuming.

This embodiment allows for a decoupling of feature tracking and motion correction and allows for the processing of larger camera frames, while keeping the computational load comparably low. According to another embodiment of the invention, the transformation is a global transformation such that a global motion correction for the events is achieved, particularly wherein the global transformation transforms the event positions for all pixels of the event camera by the same projection function, particularly wherein a depth information such as a depth value is associated to each pixel of the event camera.

According to another embodiment of the invention, the motion-corrected image is given by $$I(x) = \Sigma_{e_j \in S} \delta(x - x_j') \qquad \text{Eq. (1)}$$

wherein $I(x)$ is the value of the motion-corrected image at the position x, $e_j$ is the $j^{th}$ event in the set S of events, $x_j'$ is the adjusted event position and $\delta$ stands for the spatial delta function, which equals one when $x_j = x_j'$ and which is zero otherwise.

According to another embodiment of the invention, the projection method is adjusting the event position according to $$x_j' = \pi(T_{t_k^f, t_j}(Z(x_j)\pi^{-1}(x_j))) \qquad \text{Eq. (2)}$$

wherein $x_j$ is the position of the $j^{th}$ event from the set with an associated event time $t_j$ and an estimated associated camera pose $T_{t_j}$, wherein $T_{t_k^f, t_j}$ is the transformation $t_j$ from the estimated camera pose at the time $t_j$ to the reference pose of the event camera $T_{t_k^f}$ at the time $t_k^f$, and wherein $\pi$ is the camera projection model and Z is the depth information for the respective event position $x_j$.

Accordingly, $\pi^{-1}$ refers to the inverted camera projection model.

This embodiment details the global approach of motion correction that allows for a decoupling of the motion correction and the feature tracking.

It can be seen that Eq. (2) is an equation that does not involve locally varying optical flows or the like, but particularly a homogenous global transformation is applied to each event.

According to another embodiment of the invention, a plurality of sets is generated, particularly wherein each set of the plurality of sets comprises events recorded temporally subsequently or simultaneously, and particularly wherein the resulting associated time intervals are delimited by the respective earliest and latest events comprised in the respective set, particularly wherein the plurality of sets is temporally ordered such that two subsequent sets are adjacent i.e. they do not comprise identical events, or the sets are overlapping, i.e. they comprise the same events by a predefined number of events, wherein for each set the corresponding motion-corrected image is generated from the respective events comprised in the set, such that a temporal series of the motion-corrected images is obtained.

The sets can comprise the same number of events per set.

The duration of the sets can vary depending on the rate the events are recorded by the event camera. Therefore, the motion-corrected images are particularly also generated at a variable rate. In contrast, the IMU data is particularly acquired at a fixed frequency. Thus, the acquisition of IMU data and the generation of sets particularly happen asynchronous.

This embodiment allows for subsequent VIO and SLAM algorithms to be performed on the series of motion-corrected images.

According to another embodiment of the invention, on a series of keyframe images that consists of a plurality of particularly selected motion-corrected images, a simultaneous localization and mapping (SLAM) method or a visual-inertial odometry (VIO) method is performed.

The concept of particularly selecting a subset of motion-corrected images as keyframe images has the advantage that the computational load can be controlled and is kept comparably low.

The term "keyframe image" is used herein as commonly used in the art. The selection of keyframe images is well-known to a person skilled in the art.

In the example section it is elaborated how a selection of motion-corrected images can be made.

According to another embodiment of the invention, SLAM method is a visual-inertial SLAM method, wherein the VIO method and/or the visual-inertial SLAM method employs the keyframe images and the IMU data to obtain a three-dimensional map comprising the landmark positions and an estimated keyframe image camera pose for each keyframe image, particularly wherein the landmark positions and the estimated keyframe image camera pose are estimated with respect to the world reference frame.

The keyframe image camera pose is particularly the reference camera pose of the respective motion-corrected image that corresponds to the keyframe image.

In the context of the application the terms "SLAM", "SLAM method" and "SLAM algorithm" are used synonymously.

According to another embodiment of the invention, the visual-inertial SLAM method and/or the VIO method comprises a non-linear optimization method, wherein the non-linear optimization method minimizes a joint cost function JC for all keyframe images particularly by varying the estimated keyframe image camera pose $T^m$ for each keyframe image and the three-dimensional landmark positions $l^n$. Here, m is an index for the M keyframe images and n is an index for the N landmarks.

This global optimization with the joint cost function (in the literature also referred to with the term "objective function") that particularly involves also the estimation of previously estimated camera poses and landmark positions (i.e. a re-evaluation of past results) allows for more precise SLAM and/or VIO results, i.e. more precise maps and camera pose estimations, which in turn allows for longer expeditions, while the mapping and localization error remains comparably small.

The combination of the generation of the motion-corrected images, and the non-linear optimization in a SLAM and/or VIO algorithm allows for the fast and precise execution of the method according to the invention. This embodiment and the dependent embodiments allow a more precise and a faster execution of SLAM and/or VIO on event based cameras particularly in fast moving environments, where the event camera is moving rapidly relative to the surrounding scene and the lighting conditions might be highly dynamic within the field of view of the event camera.

According to another embodiment of the invention, the joint cost function comprises a sum of an inertial error term for each keyframe image and a re-projection error term for each landmark and for each keyframe image, wherein the re-projection error term and the inertial error term are minimized, wherein the cost function is particularly given by:

$$JC \approx \sum_{m=1}^{M} \sum_{n \in J(m)} \varepsilon_r^{n,m^T} W_r^{n,m} \varepsilon_r^{n,m} + \sum_{m=1}^{M-1} \varepsilon_S^{m^T} W_S^m \varepsilon_S^m \qquad \text{Eq. (3)}$$

wherein JC is the joint cost function, M is the number of keyframe images, J(m) are the landmarks comprised in the respective $m^{th}$ keyframe image, $\varepsilon_r^{n,m}$ is a re-projection error of the $n^{th}$ landmark in the $m^{th}$ keyframe, $W_r^{n,m}$ is an associated weighting factor for the re-projection error, $\varepsilon_S^m$ is an inertial error of the $m^{th}$ keyframe image and $W_S^m$ is the associated weighting factor of the inertial error, wherein the re-projection error is given by $\varepsilon_r^{n,m} = z^{n,m} - \pi(T_{CW}^m l^n)$ wherein $z^{n,m}$ is an estimated two-dimensional landmark position of the $n^{th}$ landmark in the $m^{th}$ keyframe image, $\pi$ is the camera projection model, and $T_{CW}^m$ is particularly a homogenous transformation of a camera frame of reference to the world reference frame for the $m^{th}$ keyframe image for the varied camera pose, $l^n$ is the estimated three-dimensional landmark position, wherein $T_{CW}^m$ (and thus the camera pose $T^m$ for the $m^{th}$ keyframe image) and $l^n$ are varied, wherein the inertial error $\varepsilon_S^m$ is estimated from the difference between the estimated camera pose from the IMU data for the $m^{th}$ keyframe image and the varied camera pose $T^m$.

According to another embodiment of the invention, the method is executed and executable more than 100 times per second, particularly more than 200 times per second.

Such execution speed is also referred to with the term "real-time", as the time lag between camera acquisition and the generation of the motion-corrected image as well as the determination of the camera pose and the updated map (i.e. landmark positions) is not or almost unnoticeable by a person.

According to another embodiment of the invention, the number of events per set is more than $10^3$ and particularly less than $10^6$ particularly for an event camera comprising 240×180 pixels.

With this number of events a reliable processing for subsequent SLAM algorithms is granted.

According to another embodiment of the invention, the sets are overlapping by more than $10^2$ events or wherein the sets not overlapping, i.e. particularly adjacent to each other, particularly for an event camera comprising 240×180 pixels.

The problem according to the invention is furthermore solved by a method for visual-inertial odometry with an event camera, wherein the event camera is rigidly connected to an inertial measurement unit (IMU), wherein the event camera comprises pixels that are configured to output events in presence of brightness changes in a scene at the time they occur, wherein each event comprises the time at which it is recorded (also referred to as event time) and a position (also referred to as event position) of the respective pixel that detected the brightness change, the method comprising the steps of:

Acquiring IMU data with the IMU unit;

Acquiring a plurality of sets each comprising a plurality of events;

For each set generating an image from the events comprised in the respective set, wherein each image is obtained by assigning the event position to a pixel coordinate of the image, such that a series of images is obtained;

Perform on a series of keyframe images that consists of a plurality of images from the series of images, a visual inertial simultaneous localization and mapping (SLAM) method and/or a visual inertial odometry (VIO) method, wherein the VIO method and/or the visual-inertial SLAM method employ the keyframe images and the IMU data to obtain a three-dimensional map comprising the landmark positions and an estimated keyframe image camera pose for each keyframe image wherein, the VIO method and/or the visual-inertial SLAM method comprises a non-linear optimization method, wherein the non-linear optimization method minimizes a joint cost function for all keyframe images, particularly by varying the estimated keyframe image camera pose for each keyframe image and the three-dimensional landmark positions.

The method allows for a rapid and accurate execution of SLAM and/or VIO algorithms such that particularly in real time or with a time lag of less than 10 ms per processed image (with an camera size of 240×180 pixels), a map of the surrounding scene of the event camera and its pose in the scene can be obtained.

The obtained accuracy and processing speed is exceeding state of the art methods for event camera based SLAM or VIO algorithms. This is particularly due to the use of the non-linear optimization method.

The concept of particularly selecting a subset of motion-corrected images as keyframe images has the advantage that the computational load can be controlled and is kept lower.

The keyframe image camera pose is particularly the reference camera pose of the respective image that corresponds to the keyframe image.

In the example section it is elaborated how a selection of motion-corrected images can be made.

According to another embodiment of the invention, the joint cost function comprises a sum of an inertial error term for each keyframe image and a re-projection error term for each keyframe image and for each landmark comprised in the respective keyframe image, wherein the re-projection error term and the inertial error term are minimized.

According to another embodiment of the invention, the cost function is particularly given by:

$$JC \approx \sum_{m=1}^{M} \sum_{n \in l(m)} \varepsilon_r^{n,m^T} W_r^{n,m} \varepsilon_r^{n,m} + \sum_{m=1}^{M-1} \varepsilon_S^{m^T} W_S^m \varepsilon_S^m$$

wherein JC is the joint cost function, M is the number of keyframe images, l(m) are the landmarks comprised in the respective $m^{th}$ keyframe image, $\varepsilon_r^{n,m}$ is a re-projection error of the $n^{th}$ landmark in the $m^{th}$ keyframe, $W_r^{n,m}$ is an associated weighting factor for the re-projection error, $\varepsilon_S^m$ is an inertial error of the $m^{th}$ keyframe image and $W_S^m$ is the associated weighting factor of the inertial error.

According to another embodiment of the invention, the re-projection error is given by $\varepsilon_r^{n,m} = z^{n,m} - \pi(T_{CW}^m l^n)$ wherein $z^{n,m}$ is an estimated two-dimensional landmark position of the $n^{th}$ landmark in the $m^{th}$ keyframe image, $\pi$ a camera projection model, and $T_{CW}^m$ is particularly a homogenous transformation of a camera frame of reference to a world reference frame for the $m^{th}$ keyframe image for the varied camera pose, $l^n$ is the estimated three-dimensional landmark position, wherein $T_{CW}^m$ and $l^n$ are varied, wherein the inertial error $\varepsilon_S^m$ is estimated from the difference between the estimated camera pose from the IMU data for the $m^{th}$ keyframe image and the varied camera pose $T^m$.

According to another embodiment of the invention, the method is executed and executable more than 100 times per second, particularly more than 200 times per second.

Such execution speed is also referred to with the term "real-time", as the time lag between camera acquisition and the generation of the motion-corrected image as well as the determination of the camera pose and the updated map (i.e. landmark positions) is not or almost unnoticeable by a person.

According to another embodiment of the invention, the number of events per set is more than $10^3$ and particularly less than $10^6$ particularly for an event camera comprising 240×180 pixels.

With this number of events a reliable processing for subsequent SLAM algorithms is granted.

According to another embodiment of the invention, the sets are overlapping by more than $10^2$ events or wherein the sets not overlapping, i.e. particularly adjacent to each other, particularly for an event camera comprising 240×180 pixels.

The problem according to the invention is also solved by a computer program comprising computer program code, wherein the computer program code is configured to execute the method according to the invention, when the computer program is executed on a computer.

According to another embodiment of the invention, the computer on which the computer program is executed is comprised or connected to the IMU and/or the event camera.

The connection of the computer to the IMU can be wireless, particularly via electromagnetic wave, such as radiofrequency or optic transmission, or via electric conducting means, such as cables or a printed circuit board.

According to another embodiment of the invention, the computer program is configured to transmit data from or to the IMU and/or the event camera to the computer, particularly wirelessly.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' or 'app' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are particularly stored in or on a non-transitory medium.

In the following Figure and Example section, the invention is explained in detail with reference to exemplary embodiments shown in the figures. It is noted that the drawings are not to scale. Features and embodiments disclosed in the example section even though disclosed in combination with other exemplary features can be separately combined with other features disclosed in another embodiment. It is noted that the processing pipeline for the methods according to the invention laid out in the following is particularly also applicable for the event images that have not been motion-corrected. For this purpose the steps and the prerequisites for generating the motion-corrected images (particularly laid out in claim 1 and its dependent subclaims) can be left out or replaced by a step that solely generates an image $I_{conv}(x)$ (as set out below and in claims 11 to claim 14) from the acquired events. Such an imager can be processed with the non-linear optimization method as laid below and throughout the description. This is particularly suitable in case rapid scene changes are not to be expected and/or when the illumination conditions are favourable.

Preliminaries.

In this section, a notation is introduced that is used throughout the rest of the description. An IMU model is disclosed that is used for the calculations comprising IMU data. Furthermore, formulas for discrete integration of the equations of motion are provided for the IMU data.

Coordinate Frame Notation.

The notation of [5] is adopted. A point P represented in a frame of reference A is written as a position vector $_A r_P$. A transformation between frames of reference such as the world reference frame W and the frame of reference of the event camera C is represented by a homogeneous matrix $T_{WC}$ that transforms points from the world reference frame W to reference frame C. The rotational part of $T_{WC}$ is expressed as a rotation matrix $R_{WC} \in SO(3)$. In experiments a DAVIS sensor [3], comprising the event camera and the IMU, is used. As the event camera and the IMU are rigidly coupled to each other, the camera frame of reference and a frame of reference of the IMU can be readily transformed to each other. The transformation can be obtained by an extrinsic calibration of the event camera and the IMU, using for example the Kalibr toolbox [6]. For reasons of simplicity and without loss of generality it is assumed that the frame of references of the IMU and the event camera are identical.

IMU Model and Motion Integration. The IMU includes a 3-axis accelerometer and a 3-axis gyroscope, and allows measuring the rotational rate and the acceleration of the IMU and thus the event camera with respect to an inertial frame such as the world reference frame W. These measurements are referred to as IMU data.

The IMU data for acceleration a and the gyroscopic data $\omega$, are affected by additive white noise $\eta$ and slowly varying sensor biases b $$_c\omega(t) = {}_w\omega(t) + b_g(t) + \eta_g(t) \text{ and } a(t) = R_{WC}{}^t(t)({}_w a(t) - {}_w g) + b_a(t) + \eta_a(t)$$

Wherein $_w g$ is the gravity vector in the world reference frame. Denoting the position vector and the velocity as $_w r(t)$ and $_w v(t)$, respectively, the equations of motion can be numerically integrated as shown in [4].

$$R_{WB}(t+\Delta t) = R_{WB}(t) \exp({}_c\omega(t) - b_g(t) - \eta_{gd}(t)\Delta t)$$

$$_w v(t+\Delta t) = {}_w v(t) + {}_w g \Delta t + R_{WB}({}_c a(t) - b_a(t) - \eta_{ad}(t))\Delta t$$

$$_w r(t+\Delta t) = {}_w r(t) + {}_w v(t)\Delta t + 0.5 {}_w g \Delta t^2 + 0.5 R_{WB}(t)({}_c a(t) - b_a(t) - \eta_{ad}(t))\Delta t^2 \quad \text{Eq. 4:}$$

where $\eta_{ad}(t)$ and $\eta_{gd}(t)$ are noise variables.

This integration scheme performs very well in practice, provided the IMU sampling rate is comparably high, e.g. above 100 Hz.

Visual-inertial odometry (VIO) is typically performed in two parallel threads:

A front-end that takes the events from the event camera as an input. The front-end generates the motion-corrected images and detects and tracks features and landmarks in the motion-corrected images.

A back-end fuses the feature tracks, the landmarks and the IMU data to continuously update the current and past camera poses.

Generation of Motion-Corrected Images.

A stream of events is provided by the event camera. The events are split in sets $S_k$ to generate motion-corrected images. The $k^{th}$ set $S_k$ comprises a predefined number of events. Optionally the sets can overlap by a predefined number of events that are shared by two adjacent sets. However, it is also possible to generate non-overlapping sets that are adjacent to each other, i.e. they do not share events.

A start time $t_k^f$ and a duration $\Delta t_k^f$ of each set are controlled by the events, which preserves the data driven nature of the method. The $k^{th}$ set $S_k$ spans the time interval $[t_k^f, t_k^f + \Delta t_k^f]$. The duration is determined by the first and last event of the set.

Figure 3:
Figure 3:
Figure 3:
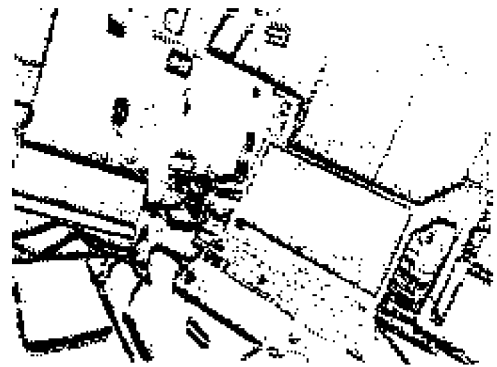

In order to arrive at an image from the set, conventionally one can accumulate the events as follows: $I_{conv}(x) = \Sigma_{e_j \in S} \delta(x - x_j)$, i.e. the intensity of the image $I_{conv}(x)$ is simply the sum of the events that comprise an event position $x_j = x$. However, this yields an event image that is not usable for reliable feature detection or tracking, as illustrated in FIG. 3. Small set sizes (FIG. 3A) do not convey enough information, while large set sizes (FIG. 3B) induce motion blur.

In contrast, the $k^{th}$ motion-corrected image is generated from the $k^{th}$ set $S_k$ of events as follows (see e.g. FIG. 2 and FIG. 3C).

$$I_k(x) = \Sigma_{e_j \in S_k} \delta(x - x_j') \quad \text{Eq. (5)}$$

where $x_j'$ is the adjusted event position, obtained by transferring the $j^{th}$ event recorded at time $t_j$ with an event position $x_j$ in a frame of reference $C_{t_j}$ of the event camera at time $t_j$ to a frame of reference $C_{t_k^f}$ of the event camera associated to a reference camera pose $T_{t_k^f}$ at the time $t_k^f$. This transfer is given by:

$$x_j' = \pi(T_{t_k^f,t_j}(Z(x_j)\pi^{-1}(x_j))), \qquad \text{Eq. (6)}$$

where $x_j$ is the position of the $j^{th}$ event from the set with an associated event time $t_j$ and an estimated associated camera pose $T_{t_j}$, wherein $T_{t_k^f,t_j}$ is the transformation between the frames of reference $C_{t_j}$, $C_{t_k^f}$ of the event camera for the respective time points from the estimated camera pose $T_{t_j}$ at the time $t_j$ to the reference pose of the event camera $T_{t_k^f}$ at the time $t_k^f$, and wherein $\pi$ is the camera projection model and $Z$ is the depth information for the respective event position $x_j$.

The incremental transformation $T_{t_k^f, t_k^f + \Delta t_k^f}$ is obtained through integration of the equations of motion (see. Eq. 4) for the IMU data acquired during the time interval $[t_k^f, t_k^f + \Delta t_k^f]$. The reference pose $T_{t_k^f}$, and the IMU biases b are known from the state estimation thread. The remaining quantities required to evaluate Eq. (6) are the transformation $T_{t_k^f, t_j}$, which can be linearly interpolated from $T_{t_k^f}$ and the camera pose $T_{t_k^f + \Delta t_k^f}$ at the time $t_k^f + \Delta t_k^f$, in the space of rigid-body motion transformations. Furthermore, $Z(x_j)$ is estimated using two-dimensional linear interpolation (on the image plane) of the landmarks, re-projected on the frame of reference $C_{t_j}$ of the camera pose $T_{t_j}$. Alternatively, the median can be used instead of interpolating the depth information $Z(x_j)$. Another option is to use three-dimensional Delaunay triangulation to interpolate the sparse depth information $Z(x_j)$.

Feature Detection.

New features are detected whenever the number of feature tracks falls below a certain threshold, or if the current motion-corrected image is selected as a keyframe image (see below). A so-called FAST corner detector [9] on the motion-corrected image can be used for this purpose. A bucketing grid is used to ensure that the features are evenly distributed over the motion-corrected image.

Feature Tracking and Landmark Triangulation.

Two types of landmarks are maintained: candidate landmarks, and persistent landmarks, whose three-dimensional position in space has been successfully triangulated. Newly extracted features are initialized as candidate landmarks, and are tracked across the motion-corrected images. As soon as a candidate landmark can be reliably triangulated (i.e. with bearing rays enclosing an angle greater than e.g. 5°), it is converted to a persistent landmark, and added to the map.

Both types of landmarks are tracked in subsequent motion-corrected images $I_k(x)$ and $I_{k+1}(x)$ using pyramidal Lukas-Kanade tracking [2]. The incremental transformation $T_{t_k^f, t_{k+1}^f}$ (integrated from the IMU data) for the time interval between $[t_k^f, t_{k+1}^f]$ is used to predict the feature position in $I_{k+1}(x)$. The patches around each feature are warped through an affine warp, computed using $T_{t_k^f, t_{k+1}^f}$, prior to pyramidal alignment. Landmarks that are not successfully tracked in the current motion-corrected event image are discarded immediately. The depth associated to persistent landmarks is used in that step. If it is not known, then only the incremental rotation is used.

Outlier Filtering.

Two-point RANSAC [10] is used (using the relative orientation between the current motion-corrected image and the last keyframe image) to further filter out outlier feature tracks. This is done between the current motion-corrected image and the last keyframe image.

Keyframe Image Selection.

A new keyframe image is selected either when the number of tracked features falls below a predefined threshold, or when the distance to the last keyframe image (scaled by the median scene depth) reaches a minimum threshold.

Initialization.

To initialize the SLAM method, the first motion-corrected images are added to the back-end without initializing any feature track. The back-end in turn estimates the initial attitude of the sensor by observing the gravity direction. The displacement between the subsequent motion-corrected images is then estimated by integrating IMU data.

Back-End.

In this section, it is exemplary described how feature tracks from the event stream obtained by the feature tracking and triangulation is fused to update the full sensor state over time.

As opposed to the Extended Kalman Filter (EKF)-based filtering employed in [11], a full smoothing approach based on non-linear optimization on selected keyframe images is used.

This is computationally tractable by use of pre-integration theory [8, 5], that consists of combining many inertial measurements (IMU data) between two keyframe images into a single relative motion constraint, thus avoiding to re-integrate IMU data in each step of the optimization. This approach considerably accelerates the optimization procedure. The back-end implementation can be based on OKVIS [7].

Formulation of Visual-Inertial Odometry.

The visual-inertial localization and mapping problem is formulated as a joint optimization of a cost function JC that contains weighted re-projection errors and inertial error terms:

$$JC \approx \sum_{m=1}^{M} \sum_{n \in J(m)} \varepsilon_r^{n,m T} W_r^{n,m} \varepsilon_r^{n,m} + \sum_{m=1}^{M-1} \varepsilon_S^{m T} W_S^m \varepsilon_S^m \qquad \text{Eq. (7)}$$

where JC is the joint cost function, M is the number of keyframe images, $J(m)$ are the landmarks comprised in the respective $m^{th}$ keyframe image, $\varepsilon_r^{n,m}$ is a re-projection error of the $n^{th}$ landmark in the $m^{th}$ keyframe, $W_r^{n,m}$ is the information matrix of the landmark measurement for the re-projection error, $\varepsilon_S^m$ is an inertial error of the $m^{th}$ keyframe image and $W_S^m$ is the information matrix of the inertial error.

The optimization is carried out, not on all the keyframe images, but on a bounded set of keyframe image composed of M keyframe images, and a sliding window containing the last H frames. In between keyframe images, the prediction of the event camera state and pose is propagated using the IMU data that fall in between the keyframe images. Google Ceres [1] optimizer is used to carry out the optimization.

Re-Projection Error.

The re-projection error is given by $\varepsilon_r^{n,m} = z^{n,m} - \pi(T_{CW}^m l^n)$ wherein $z^{n,m}$ is an estimated two-dimensional landmark position of the $n^{th}$ landmark in the $m^{th}$ keyframe image, $\pi$ is the camera projection model, and $T_{CW}^m$ is particularly a homogenous transformation of a camera frame of reference to the world reference frame for the $m^{th}$ keyframe image for the varied camera pose, $l^n$ is the estimated three-dimensional landmark position, wherein $T_{CW}^k$ (and thus the camera pose $T^m$ for the $m^{th}$ keyframe image) and $l^n$ are varied.

Inertial Error.

The inertial error $\varepsilon_S^m$ is estimated from the difference between the estimated camera pose from the IMU data for the $k^{th}$ keyframe image and the varied camera pose $T^m$. The IMU equations of motion (Eq. 4) are used to predict the current state based on the previous state. Then, the inertial errors are simply computed as the difference between the predictions based on the previous state and the actual state. For orientation, a simple multiplicative minimal error is used.

Keyframe Image Marginalization.

Keeping all keyframe images in the Gauss-Newton system state quickly becomes intractable. However, simply discarding measurements from past keyframe images neglects valuable information. To overcome this problem, old keyframe images are partially marginalized out using the Schur complement on the corresponding observations. This turns old measurements into a prior for the system, represented as summands in the construction of the Schur complement. Details are disclosed in [7].

Parameters. The sets size can be selected for all datasets, particularly in the range of $10^3$ to $10^5$ events. This translates to a set duration of about 5 to 10 milliseconds. The patch size used for feature tracking can be 32×32 pixels, with 2 pyramid levels. The event camera has 240×180 pixels with a 1 kHz IMU (DAVIS sensor [3]).

These are exemplary parameters that can be adapted depending on the event camera and IMU used, the environment, the desired trade-off between accuracy and performance, etc.

FIG. 1 shows a schematic time line representation (indicated by the parallel horizontal arrows) for events recorded at different times. The events are grouped in a plurality of overlapping sets (indicated by the horizontal lines above the time line arrow), wherein each set consists of the same number of events (4 events in the schematic case) and the overlap of the sets is constant (namely two events on both ends of each set). The events are depicted as dots on the upper time line arrow, wherein the earliest and latest event times of each set are written below the dots and connected with a dashed line. Note that the lower index of the earliest and latest event times refers to the corresponding set number. The duration of each set depends on the event time of the first (earliest) event of each set and the last (latest) event of each set, i.e. the event rate.

Figure 2:
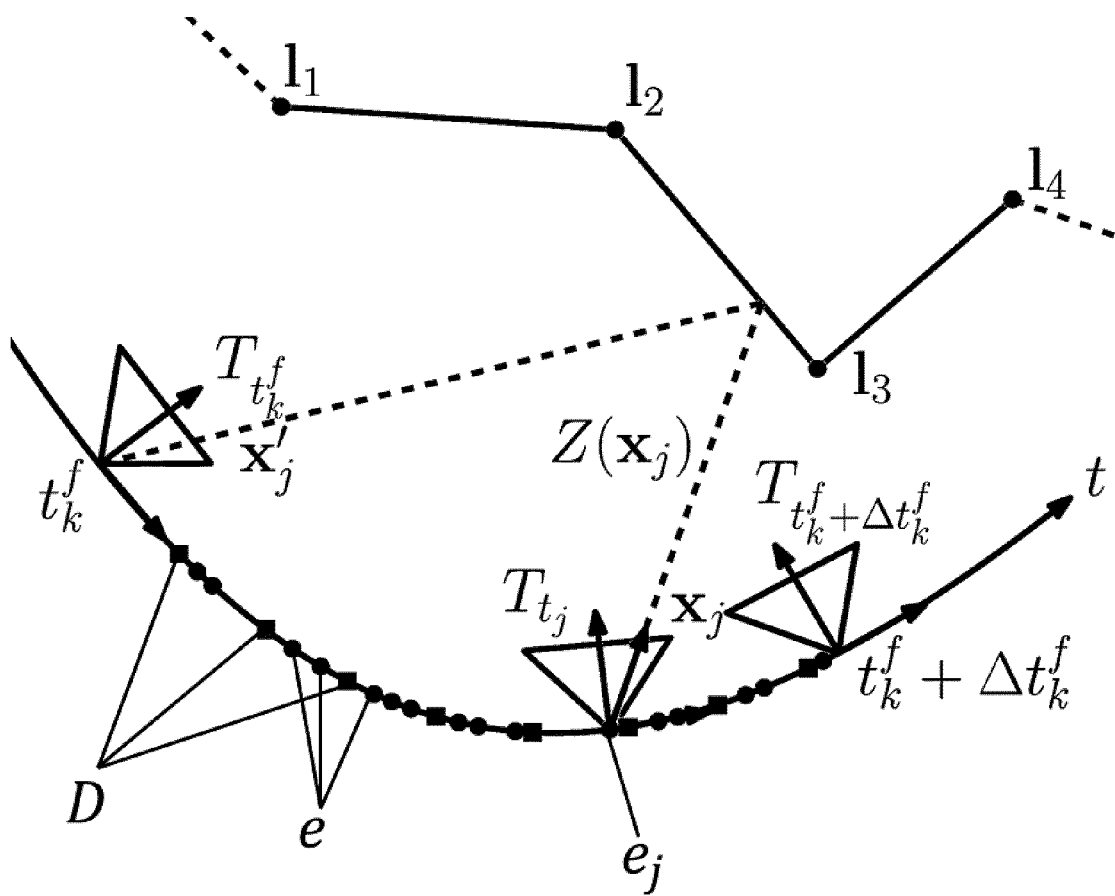

FIG. 2 schematically shows how the event position is adjusted for the motion of the event camera during the set acquisition of the $k^{th}$ set. Landmarks are indicates as $l_1$, to $l_4$. The trajectory of the event camera and its associated camera pose is depicted as a solid, curved arrow line, wherein the camera pose $T_{t_k^f}$ at the time $t_k^f$ is indicated by a triangle. Accordingly, the camera pose $T_{t_k^f+\Delta t_k^f}$ at the latest event time $t_k^f+\Delta t_k^f$ of the set is shown. On the trajectory dots represent the recording time of an event (e), and squares indicate the acquisition of IMU data (D).

The camera poses $T_{t_k^f}$ and $T_{t_k^f+\Delta t_k^f}$ are estimated by integration (see Eq. 4) of the acquired IMU data. The intermediate camera pose $T_{t_j}$ at the event time $t_j$ can be estimated by interpolation.

In order to adjust the position of the event recorded at time $t_j$ for a motion-corrected image, the event position is projected on a three-dimensional world reference frame, by means of a depth information Z obtained from the landmark positions, and a projection model of the event camera. From the world reference frame the three-dimensional position of the projected event is re-projected and transformed in a frame of reference of the camera at the reference time $t_k^f$, that corresponds to a camera pose at the reference time.

By adjusting all event positions to the frame of reference of the event camera for the reference time and the associated reference camera pose, the motion-corrected image is obtained.

FIG. 3 shows various examples of image formation from events. Each event is depicted as a black dot at its recorded position. FIG. 3A and FIG. 3B are images generated without adjusting the event positions. FIG. 3A shows an example where only 3.000 events have been used to generate an image. While a motion blur is not readily detectable (because the set time is so short, that the camera hardly moves during the time interval) the image is corrupted by noise, owed to the small number of events.

If a greater number of events, here 30,000, is collected per set, motion blur becomes visible and prominent (see FIG. 3B). On such images VIO or SLAM methods will not be able to reliable identify features and feature positions, which render such images problematic for VIO or SLAM.

In FIG. 3C, a motion-corrected image according to the invention is shown. The event number is 30.000 per set. The motion-corrected image exhibits neither motion blur nor excessive noise and is therefore ideally suited for VIO or SLAM.

REFERENCES

[1] A. Agarwal, K. Mierle, and Others. Ceres solver. http://ceres-solver.org.

[2] S. Baker and I. Matthews. Lucas-kanade 20 years on: A unifying framework. Int. J. Comput. Vis., 56(3):221-255, 2004.

[3] Christian Brandli, Raphael Berner, Minhao Yang, Shih-Chii Liu, and Tobi Delbruck. A 240×180 130 dB 3 us latency global shutter spatiotemporal vision sensor. IEEE J. Solid-State Circuits, 49(10):2333-2341, 2014. ISSN 0018-9200. doi: 10.1109/JSSC. 2014.2342715.

[4] Christian Forster, Luca Carlone, Frank Dellaert, and Davide Scaramuzza. IMU preintegration on manifold for efficient visual-inertial maximum-a-posteriori estimation. In Robotics: Science and Systems (RSS), 2015. doi: 10.15607/RSS.2015.X1.006.

[5] Christian Forster, Luca Carlone, Frank Dellaert, and Davide Scaramuzza. On-manifold preintegration for real-time visual-inertial odometry. IEEE Trans. Robot., 33(1): 1-21, 2017. doi: 10.1109/TRO.2016.2597321.

[6] P. Furgale, J. Rehder, and R. Siegwart. Unified temporal and spatial calibration for multi-sensor systems. In IEEE/RSJ Int. Conf. Intell. Robot. Syst. (IROS), 2013.

[7] S. Leutenegger, S. Lynen, M. Bosse, R. Siegwart, and P. Furgale. Keyframe-based visual-inertial odometry using nonlinear optimization. Int. J. Robot. Research, 2015.

[8] T. Lupton and S. Sukkarieh. Visual-inertial-aided navigation for high-dynamic motion in built environments without initial conditions. IEEE Trans. Robot., 28(1):61-76, February 2012.

[9] E. Rosten and T. Drummond. Machine learning for high-speed corner detection. In Eur. Conf. Comput. Vis. (ECCV), pages 430-443, 2006. doi: 10.1007/11744023_34.

[10] C. Troiani, A. Martinelli, C. Laugier, and D. Scaramuzza. 2-point-based outlier rejection for camera-imu systems with applications to micro aerial vehicles. In IEEE Int. Conf. Robot. Autom. (ICRA), 2014.

[11] A. Zhu, N. Atanasov, and K. Daniilidis. Event-based visual inertial odometry. In Proc. IEEE Int. Conf. Comput. Vis. Pattern Recog., 2017.

The invention claimed is:

1. A method for generating a motion-corrected image for visual-inertial odometry using an event camera rigidly connected to an inertial measurement unit (IMU), wherein the event camera comprises pixels arranged in an image plane that are configured to output events (e) in presence of brightness changes in a scene at the time they occur, wherein each event (e) comprises the time at which it is recorded and a position of the respective pixel that detected the brightness change, the method comprising the steps of:

Acquiring at least one set of events (S), wherein the at least one set (S) comprises a plurality of subsequent events (e);
   Acquiring IMU data (D) for the duration of the at least one set (S);
   Generating a motion-corrected image from the at least one set (S) of events (e), wherein the motion-corrected image is obtained by assigning the position ($x_j$) of each event ($e_j$) recorded at its corresponding event time ($t_j$) at an estimated camera pose ($T_{t_j}$) to an adjusted event position ($x_j'$), wherein the adjusted event position ($x_j'$) is obtained by determining the position of the event ($e_j$) for an estimated reference camera pose ($T_{t_k^f}$) at a reference time ($t_k^f$), wherein the estimated camera pose ($T_{t_j}$) at the event time ($t_j$) and the estimated reference camera pose ($T_{t_k^f}$) at the reference time ($t_k^f$) are estimated by means of the IMU data (D),
wherein from the IMU data the estimated camera pose ($T_{t_j}$) at the event time ($t_j$) is estimated by means of a homogenous transformation ($T_{t_k^f,t_j}$) of the estimated reference camera pose ($T_{t_k^f}$) at the reference time ($t_k^f$) to the estimated camera pose ($T_{t_j}$).

2. The method according to claim 1, wherein for the determination of the adjusted event position ($x_j'$) for the estimated reference camera pose ($T_{t_k^f}$), a projection method is executed comprising the steps of:

Estimating a depth information (Z) for each event position in a world reference frame for the estimated camera pose ($T_{t_j}$), wherein the depth information (Z) is estimated from a plurality of three-dimensional positions of landmarks;
   Providing a camera projection model ($\pi$) that is configured to project a three-dimensional position onto a two-dimensional position in the image plane of the event camera;
   Using the camera projection model ($\pi$), the depth information (Z) and the transformation ($T_{t_k^f,t_j}$) to project each event position recorded at the estimated camera pose at its corresponding event time from the image plane onto a three-dimensional position in the world reference frame and re-projecting the event position from the world reference frame onto the image plane of the estimated reference camera pose ($T_{t_k^f}$) at the reference time ($t_k^f$).

3. The method according to claim 1, wherein the motion-corrected image is given by $$I(x) = \sum_{e_j \in S} \delta(x - x_j')$$

wherein I(x) is the value of the motion-corrected image at the position x, $e_j$ is the $j^{th}$ event in the set S of events, and $x_j'$ is the adjusted event position, wherein $\delta$ is the delta-function.

4. The method according to claim 2, wherein the projection method adjusts each event position according to $$x_j' = \pi(T_{t_k^f,t_j}(Z(x_j)\pi^{-1}(x_j)))$$

wherein $x_j$ is the position of the $j^{th}$ event from the set with an corresponding event time $t_j$ and an estimated camera pose ($T_{t_j}$), wherein $T_{t_k^f,t_j}$ is the transformation ($T_{t_k^f,t_j}$) from the estimated camera pose ($T_{t_j}$) at the event time ($t_j$) to the estimated reference camera pose ($T_{t_k^f}$) at the reference time ($t_k^f$), wherein $\pi^{-1}$ refers to the inverted camera projection model ($\pi$), and Z is the depth information (Z), for the respective event position $x_j$.

5. The method according to claim 1, wherein a plurality of sets (S) is acquired, wherein each set comprises the same predefined number of events (e), wherein for each set the corresponding motion-corrected image is generated, such that a temporal series of the motion-corrected images is obtained.

6. The method according to claim 5, wherein on a series of keyframe images that consists of a plurality of motion-corrected images from the series of motion-corrected images, a simultaneous localization and mapping (SLAM) method and/or a visual inertial odometry method is performed.

7. The method according to claim 6, wherein the SLAM method is a visual-inertial SLAM method, wherein the visual inertial odometry method and/or the visual-inertial SLAM method employ the keyframe images and the IMU data to obtain a three-dimensional map comprising landmark positions and an estimated keyframe image camera pose for each keyframe image.

8. The method according to claim 7, wherein the visual-inertial SLAM method and/or the VIO method comprises a non-linear optimization method, wherein the non-linear optimization method minimizes a joint cost function for all keyframe images.

9. The method according to claim 8, wherein the joint cost function comprises a sum of an inertial error term for each keyframe image and a re-projection error term for each landmark and for each keyframe image, wherein the re-projection error term and the inertial error term are minimized, wherein the cost function is given by:

$$JC \approx \sum_{m=1}^{M} \sum_{n \in l(m)} \varepsilon_r^{n,m\,T} W_r^{n,m} \varepsilon_r^{n,m} + \sum_{m=1}^{M-1} \varepsilon_S^{m\,T} W_S^m \varepsilon_S^m$$

wherein JC is the joint cost function, M is the number of keyframe images, l(m) are the landmarks comprised in the respective $m^{th}$ keyframe image, $\varepsilon_r^{n,m}$ is a re-projection error of the $n^{th}$ landmark in the $m^{th}$ keyframe, $W_r^{n,m}$ is an associated weighting factor for the re-projection error, $\varepsilon_S^m$ is an inertial error of the $m^{th}$ keyframe image and $W_S^m$ is the associated weighting factor of the inertial error, wherein the inertial error $\varepsilon_S^m$ is estimated from the difference between the estimated camera pose from the IMU data for the $m^{th}$ keyframe image and the varied camera pose $T^m$.

10. A method for visual-inertial odometry with an event camera, wherein the event camera is rigidly connected to an inertial measurement unit (IMU), wherein the event camera comprises pixels that are configured to output events in presence of brightness changes in a scene at the time they occur, wherein each event comprises the time at which it is recorded and a position of the respective pixel that detected the brightness change, the method comprising the steps of:

Acquiring IMU data (D) with the IMU unit;

Acquiring a plurality of sets (S) each comprising a plurality of events (e);

For each set (S) generating an image from the events comprised in the respective set (S), wherein each image is obtained by assigning the event position ($x_j$) to a pixel coordinate of the image, such that a series of images is obtained;

Perform on a series of keyframe images that consists of a plurality of images from the series of images, a visual inertial simultaneous localization and mapping (SLAM) method and/or a visual inertial odometry (VIO) method, wherein the VIO method and/or the visual-inertial SLAM method employ the keyframe images and the IMU data to obtain a three-dimensional map comprising the landmark positions and an estimated keyframe image camera pose for each keyframe image characterized in that, the VIO method and/or the visual-inertial SLAM method comprises a non-linear optimization method, wherein the non-linear optimization method minimizes a joint cost function for all keyframe images.

11. The method according to claim 10, wherein the joint cost function comprises a sum of an inertial error term for each keyframe image and a re-projection error term for each keyframe image and for each landmark comprised in the respective keyframe image, wherein the re-projection error term and the inertial error term are minimized.

12. The method according to claim 11, wherein the cost function is given by:

$$JC \approx \sum_{m=1}^{M} \sum_{n \in l(m)} \varepsilon_r^{n,m^T} W_r^{n,m} \varepsilon_r^{n,m} + \sum_{m=1}^{M-1} \varepsilon_S^{m^T} W_S^m \varepsilon_S^m$$

wherein JC is the joint cost function, M is the number of keyframe images, l(m) are the landmarks comprised in the respective $m^{th}$ keyframe image, $\varepsilon_r^{n,m}$ is a re-projection error of the $n^{th}$ landmark in the $m^{th}$ keyframe, $W_r^{n,m}$ is an associated weighting factor for the re-projection error, $\varepsilon_S^m$ is an inertial error of the $m^{th}$ keyframe image and $W_S^m$ is the associated weighting factor of the inertial error.

13. The method according to claim 11, wherein the re-projection error is given by $\varepsilon_r^{n,m} = z^{n,m} - \pi(T_{CW}^m l^n)$ wherein $z^{n,m}$ is an estimated two-dimensional landmark position of the $n^{th}$ landmark in the $m^{th}$ keyframe image, $\pi$ a camera projection model, and $T_{CW}^m$ is a homogenous transformation of a camera frame of reference to a world reference frame for the $m^{th}$ keyframe image for the varied camera pose, $l^n$ is the estimated three-dimensional landmark position, wherein $T_{CW}^m$ and $l^n$ are varied, wherein the inertial error $\varepsilon_S^m$ is estimated from the difference between the estimated camera pose from the IMU data for the $m^{th}$ keyframe image and the varied camera pose $T^m$.

14. A method for generating a motion-corrected image for visual-inertial odometry using an event camera rigidly connected to an inertial measurement unit (IMU), wherein the event camera comprises pixels arranged in an image plane that are configured to output events (e) in presence of brightness changes in a scene at the time they occur, wherein each event (e) comprises the time at which it is recorded and a position of the respective pixel that detected the brightness change, the method comprising the steps of:

Acquiring at least one set of events (S), wherein the at least one set (S) comprises a plurality of subsequent events (e);

Acquiring IMU data (D) for the duration of the at least one set (S);

Generating a motion-corrected image from the at least one set (S) of events (e), wherein the motion-corrected image is obtained by assigning the position ($x_j$) of each event ($e_j$) recorded at its corresponding event time ($t_j$) at an estimated camera pose ($T_{t_j}$) to an adjusted event position ($x_j'$), wherein the adjusted event position ($x_j'$) is obtained by determining the position of the event ($e_j$) for an estimated reference camera pose ($T_{t_k^f}$) at a reference time ($t_k^f$), wherein the estimated camera pose ($T_{t_j}$) at the event time ($t_j$) and the estimated reference camera pose ($T_{t_k^f}$) at the reference time ($t_k^f$) are estimated by means of the IMU data (D), wherein the motion-corrected image is given by $$I(x) = \sum_{e_j \in S} \delta(x - x_j')$$

wherein l(x) is the value of the motion-corrected image at the position x, $e_j$ is the $j^{th}$ event in the set S of events, and $x_j'$ is the adjusted event position, wherein $\delta$ is the delta-function.

15. The method according to claim 14, wherein a plurality of sets (S) is acquired, wherein each set comprises the same predefined number of events (e), wherein for each set the corresponding motion-corrected image is generated, such that a temporal series of the motion-corrected images is obtained.

16. The method according to claim 15, wherein on a series of keyframe images that consists of a plurality of motion-corrected images from the series of motion-corrected images, a simultaneous localization and mapping (SLAM) method and/or a visual inertial odometry method is performed.

17. The method according to claim 16, wherein the SLAM method is a visual-inertial SLAM method, wherein the visual inertial odometry method and/or the visual-inertial SLAM method employ the keyframe images and the IMU data to obtain a three-dimensional map comprising landmark positions and an estimated keyframe image camera pose for each keyframe image.

18. The method according to claim 17, wherein the visual-inertial SLAM method and/or the VIO method comprises a non-linear optimization method, wherein the non-linear optimization method minimizes a joint cost function for all keyframe images.

19. The method according to claim 18, wherein the joint cost function comprises a sum of an inertial error term for each keyframe image and a re-projection error term for each landmark and for each keyframe image, wherein the re-projection error term and the inertial error term are minimized, wherein the cost function is given by:

$$JC \approx \sum_{m=1}^{M} \sum_{n \in l(m)} \varepsilon_r^{n,m^T} W_r^{n,m} \varepsilon_r^{n,m} + \sum_{m=1}^{M-1} \varepsilon_S^{m^T} W_S^m \varepsilon_S^m$$

wherein JC is the joint cost function, M is the number of keyframe images, l(m) are the landmarks comprised in the respective $m^{th}$ keyframe image, $\varepsilon_r^{n,m}$ is a re-projection error of the $n^{th}$ landmark in the $m^{th}$ keyframe, $W_r^{n,m}$ is an associated weighting factor for the re-projection error, $\varepsilon_S^m$ is an inertial error of the $m^{th}$ keyframe image and $W_S^m$ is the associated weighting factor of the inertial error, wherein the inertial error $\varepsilon_S^m$ is estimated from the difference between the estimated camera pose from the IMU data for the $m^{th}$ keyframe image and the varied camera pose $T^m$.

* * * * *